United States Patent [19]

Currie et al.

[11] 4,319,133

[45] Mar. 9, 1982

[54] PHOTOELECTRIC DETECTION SYSTEM

[75] Inventors: James R. Currie; Raymond R. Schansman, both of Huntsville, Ala.

[73] Assignee: The United States of America as represented by the Administrator of the National Aeronautics and Space Administration, Washington, D.C.

[21] Appl. No.: 145,272

[22] Filed: Apr. 30, 1980

[51] Int. Cl.³ ............................................. G01D 21/04
[52] U.S. Cl. ................................. 250/214 B; 250/221
[58] Field of Search .................... 250/221, 222, 214 B, 250/574, 561

[56] References Cited

U.S. PATENT DOCUMENTS 4,029,957  6/1977  Betz et al. ............................. 250/221

Primary Examiner—David C. Nelms
Assistant Examiner—Darwin R. Hostetter
Attorney, Agent, or Firm—Joseph H. Beumer; John R. Manning; L. D. Wofford, Jr.

[57] ABSTRACT

A photoelectric beam system for the detection of the arrival of an object at a discrete station wherein artificial light, natural light, or no light may be present. A signal generator turns on and off a signal light at a selected frequency. When the object in question arrives on station, ambient light is blocked by the object, and the light from the signal light is reflected onto a photoelectric sensor which has a delayed electrical output but is of the frequency of the signal light. Outputs from both the signal source and the photoelectric sensor are fed to inputs of an exclusively OR detector which provides as an output the difference between them. The difference signal is a small width pulse occurring at the frequency of the signal source. By filter means, this signal is distinguished from those responsive to sunlight, darkness, or 120 Hz artificial light. In this fashion, the presence of an object is positively established.

7 Claims, 4 Drawing Figures

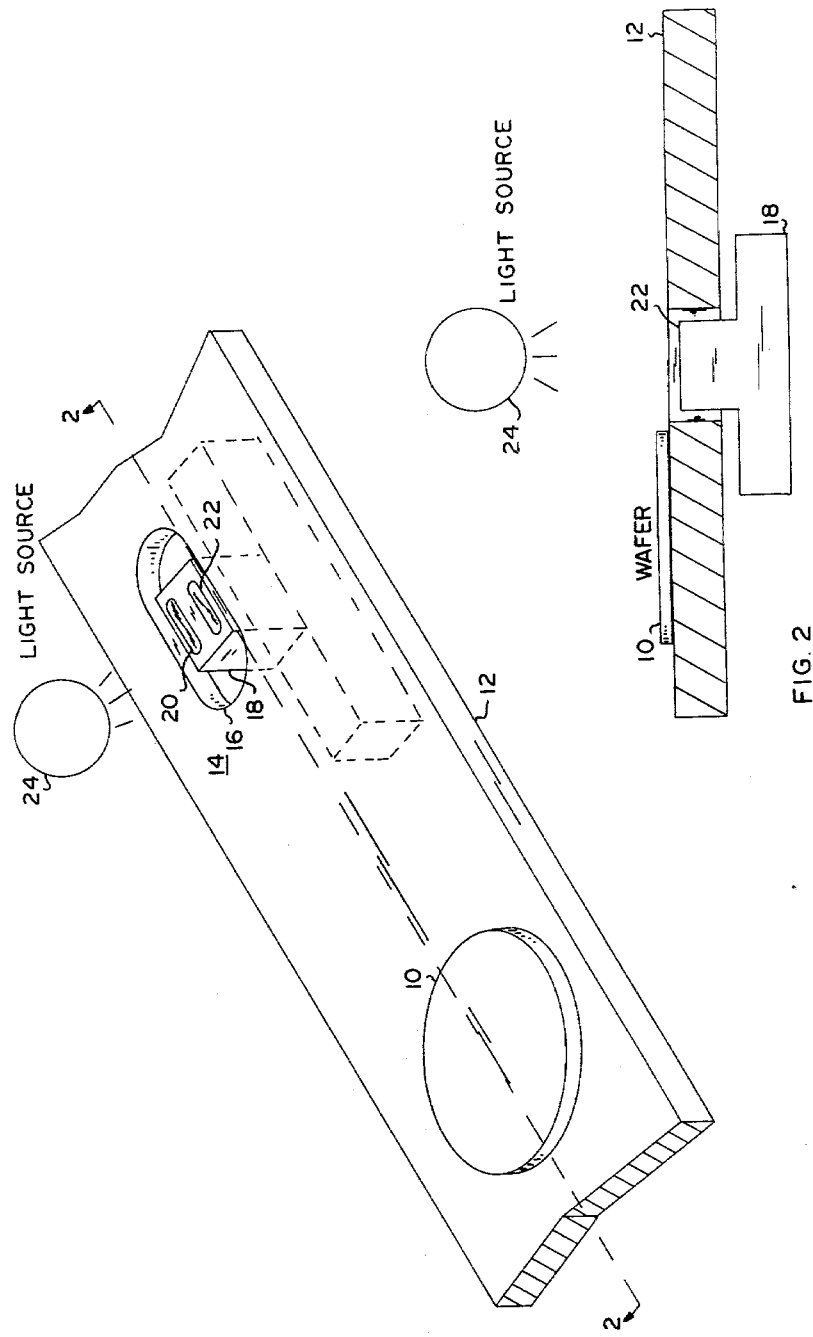

PHOTOELECTRIC DETECTION SYSTEM

ORIGIN OF THE INVENTION

The invention described herein was made by an employee of the United States Government and may be manufactured and used by or for the Government of the United States for governmental purposes without the payment of any royalties thereon or therefor.

TECHNICAL FIELD

This invention relates to photoelectric systems for detecting the presence of objects, and particularly to a system for detecting the presence of a silicon wafer, or other object, at a discrete station along a restricted path or track.

BACKGROUND ART

The time of arrival and location of an object at a manufacturing station is critical in certain manufacturing processes. This is particularly the case in the fabrication of integrated electrical circuits from wafers of silicon. In the past, the detection of this arrival at a station has been accomplished by the use of a photoelectric system at the station, and wherein unmodulated signal light is directed onto and is reflected from a wafer, and the detection of the reflected light signals the arrival of the wafer. Such a system functions well in environmental darkness, but does not in the presence of other typical light conditions. Thus, sunlight tends to wash out the unmodulated signal light or to be otherwise undetectable from it, and artificial light presents a distinct modulation at a 120 Hz rate which makes it difficult to discriminate between it and signal light. Further, it is often inconvenient or impractical to simply mount a light above a station and detect the obstruction of a light path because of space or other restrictions.

It is the object of this invention to provide a photoelectric system for the described usage which is relatively immune to ambient light, whether it be natural or artificially produced, will fit and operate in most situations, and is inexpensive to manufacture and install.

SUMMARY OF THE INVENTION

In accordance with this invention, a manufacturing station would include an opening in a track along and over which an object is moved. A signal light is directed upward through the opening, and, in the presence of an object, this light is reflected back to a photodetector. The signal light is powered by a relatively low frequency pulse power, and the photodetector detects the emitter pulses of light; however, the photodetector response will create a time delay with each pulse. A sample of the pulse input power and output of the photodetector is fed to inputs of an exclusively OR detector, which then provides as an output short duration pulses, equal in width to the delay, and at twice the frequency of the signal light. In instances where an object is not present and ambient light is, the output of the exclusively OR detector will include substantially longer duration pulses. The output of the exclusively OR circuit is fed through filter circuits which discriminate between the short duration pulses and longer duration pulses, and thereby indicate when an object arrives at a station.

BRIEF DESCRIPTION OF THE DRAWINGS

FIG. 1 is a pictorial view, partially diagrammatic, illustrating the arrangement of the system of the present invention.

FIG. 2 is a sectional view taken along line 2—2 of FIG. 1.

DETAILED DESCRIPTION OF THE DRAWINGS

Figure 3:
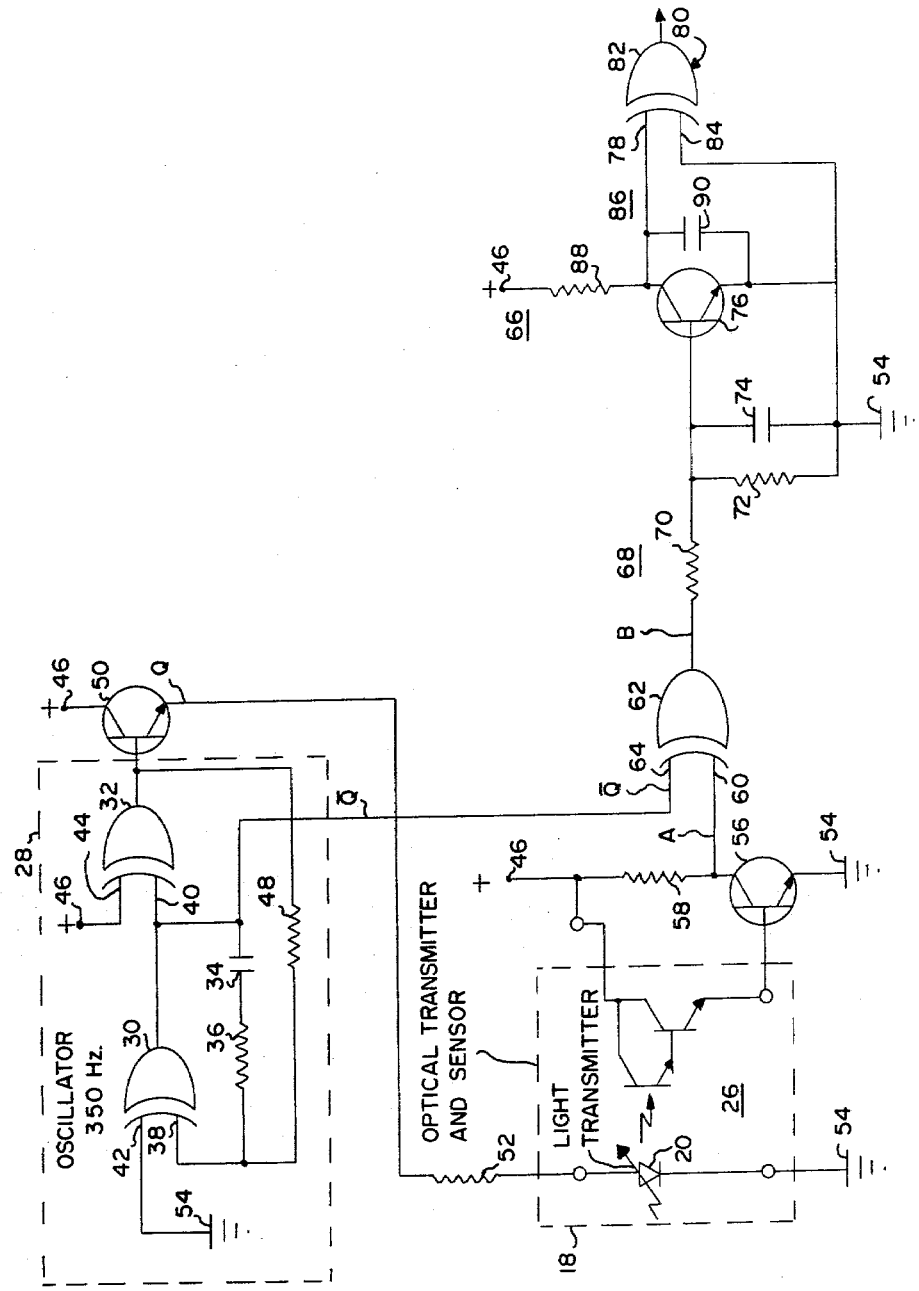
FIG. 3 is an electrical block diagram of the system of this invention.

Referring to FIG. 1, an object, e.g., a silicon wafer, 10 is moved along a track or support 12, as by air jets (not shown). Periodically, it is moved to one or more operational stations, e.g., station 14, where some operation is to be performed on it. For example, such may entail it being picked off track 12 by a mechanical arm, subjecting it to a discrete manufacturing operation, and then being placed back on track 12 for further movement along the track and still further operations. An opening or window 16 is formed in track 12, and mounted under this opening is an optical detector or sensor assembly 18, an example of which is a reflective object sensor type MCA7. It is schematically illustrated in FIG. 3 and includes a light emitter in the form of a light emitting diode, L.E.D. 20, which emits light upward through window 16. When wafer 10 is present over window 16, the light is reflected back from the wafer through window 16 and is detected by a photosensor, in this case, phototransistor 22 of optical sensor assembly 18. When wafer 10 is not over window 16, typically light from an environmental source, represented by source 24, would impinge on and be detected by phototransistor 22.

L.E.D. 20 is powered by a 350 Hz signal derived from oscillator 28. Oscillator 28 is constructed with two exclusively OR detectors (Ex. OR Det.) 30 and 32 serially connected with the frequency rate set by the values of capacitor 34 and resistors 36 and 48. The output of Ex. OR Det. 30 is connected to input terminal 40 of Ex. OR Det. 32. Terminal 42 of Ex. OR Det. 30 is connected to ground, and the otherwise free terminal 44 of Ex. OR Det. 32 is connected to plus terminal 46. The output of Ex. OR Det. 32 is connected through resistor 48 to terminal 38 of Ex. OR Det. 30 in order to charge capacitor 34 to a level that will cause the output of Ex. OR Det. 30 and 32 to switch states. With each state change, capacitor 34 will charge in the opposite direction, thus causing oscillation.

The 350 Hz output of oscillator 28, waveform Q of FIG. 3, is applied to the base input of emitter follower connected transistor 50. L.E.D. 20 constitutes the emitter load of transistor 50, and thereby L.E.D. 20 is powered by bias current applied from plus terminal 46, through transistor 50 and L.E.D. 20, resistor 52, to ground terminal 54. Accordingly, transistor 50, and thus L.E.D. 20, are turned on together in accordance with waveform Q, light being emitted when the waveform is in a "1" state, as shown.

Figure 4:
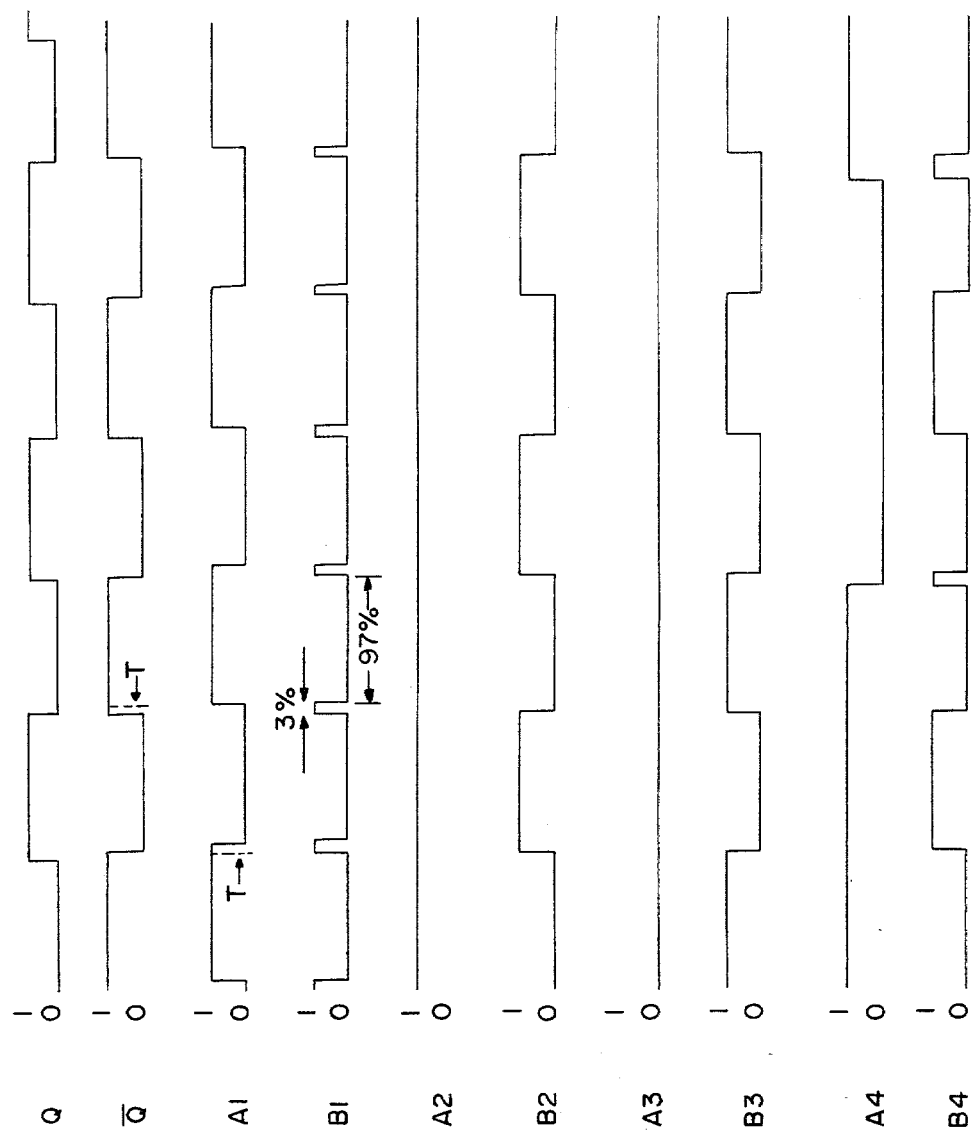
FIG. 4 is a series of waveforms illustrative of the operation of the system of this invention.

Assume now that wafer 10 is positioned at station 14 over window 16 to reflect emitted light to phototransistor 22. Phototransistor 22 is biased between plus terminal 46 and ground through the base-emitter circuit of transistor 56 to turn transistor 56 "on" responsive to the output of L.E.D. 20 when the latter receives significant light. Waveform A1 of FIG. 4 illustrates the output of transistor 56 at sample point A, its output going to a low or "0" state when light is received by phototransistor 22, and to a high or "1" state when significant light is not received. This output appears between the collector and ground of transistor 56, transistor 56 being powered through resistor 58 connected between plus terminal 46 and its collector. There is a delay in the response of phototransistor 22, a particular characteristic of photosensor assembly 18; and at the 350 Hz rate of "turn on" of L.E.D. 20, and thus the output of transistor 56, the delay represents approximately 3% of a "turn on" cycle. This delay is illustrated by time marker T in waveforms Q and A of FIG. 4.

The output of transistor 56 is applied to input terminal 60 of Ex. OR det. 62. A second input, illustrated as waveform $\overline{Q}$ in FIG. 4, and the inverse of waveform Q, is obtained from the output of Ex. OR Det. 30 of oscillator 28, and it is applied to input terminal 64 of Ex. OR Det. 62. It will be noted that the $\overline{Q}$ waveform is high at the same time that the A waveform is high, except for the period T, resulting from the delayed response referred to above.

Since by definition the output of an exclusively OR detector will provide an output when there is a significant input at one, and only one, of its inputs, with waveforms A and $\overline{Q}$ present, the output of Ex. OR Det. 62 will be as shown in B1, with a short width pulse output each half cycle of the 350 Hz signal corresponding to the time periods T of waveform $\overline{Q}$ and A. The output of Ex. OR Det. 62 is fed to signal discriminating circuit 66. This circuit functions to provide a first discrete output when a wafer is present at station 14 and as driven by a waveform B1, and to provide a second discrete output when the wafer is not present and the circuit is driven by one of a series of other waveforms, as will be described. When wafer 10 is not present, that is, at station 14 and covering window 16, environmental light (if any present) will pass through window 16 to phototransistor 22 rather than the 350 Hz light. Discriminating circuit 66 is adapted to anticipate that environmental light will be (1) a no light state, (2) a continuous or steady light state, e.g., as from sunlight, or (3) a 120 Hz light, as from a 60 Hz powered incandescent or fluorescent light. These, of course, are the conditions likely to be encountered in a work space.

Discriminating circuit 66 employs two filter stages through which the output of Ex. OR Det. 62 is fed. First filter stage 68 consists of resistor 70 in series with the parallel combination of resistor 72 and capacitor 74, the latter two elements being connected across the base-emitter circuit of transistor 76. The values of resistors 70 and 72 and capacitor 74 are selected such that the turn-on voltage for transistor 76, appearing at the base of transistor 76, will not be reached unless the output pulses from Ex. OR Det. 62 are longer than 5% of the duty cycle of the 350 Hz signal. This thus prevents transistor 76 from switching on when wafer 10 is present since, as described, these pulses are of a width less than 5%. By remaining in an "off" state, the output of transistor 76 remains high, or in a "1" state. This "1" output is fed to input terminal 78 of amplifier 80, in this case, comprising Ex. OR Det. 82, and a continuous "0" signal is fed to the other terminal, terminal 84, of Ex. OR Det. 82 from ground terminal 54. Under these circumstances, the output of amplifier 80, signal C, follows the output state of transistor 76 and provides a "1" state output, and thereby indicating that wafer 10 is present at station 14.

Second filter stage 86 of discriminating circuit 66 is adapted to insure that if a wafer is not present, the output C of amplifier 80 indicates this by a low or "0" signal. Filter stage 86 consists of resistor 88 in series between plus terminal 46 and the collector of transistor 76 and capacitor 90 connected across the collector-emitter circuit of transistor 76. Values for resistor 88 and capacitor 90 are chosen such that transistor 76 must be off for two cycles of the 350 Hz cycle rate before capacitor 90 can charge up to 50% of the supply voltage through resistor 88, the switching level for Ex. OR Det. 82. The operating characteristics are such that switching will occur without wafer 10 present since environmental light (or the absence of it) will cause transistor 76 to be triggered "on" for some period of each cycle, as will be described. To illustrate this, if we assume an environmentally dark condition and no light strikes phototransistor 22, the input to terminal 60 of Ex. OR Det. 62 will be high (transistor 56 will be off), as shown in waveform A2, and the output of Ex. OR Det. 62 will be a rectangular wave at the 350 Hz rate as shown in waveform B2, following the inverse of the $\overline{Q}$ input to terminal 64. This switches transistor 76 on and off at the 350 Hz rate, but as per the operation of second filter stage 86, the voltage across capacitor 90 will not charge or rise up to the "turn on" level for Ex. OR Det. 82, and thus its output will remain low or at a "0" level. This, of course, is indicative of wafer 10 not being at station 14.

If there is simply a continuous light condition applied to photodetector 26, as from sunlight, the output of phototransistor 22 will turn transistor 56 on continuously, and a low or "0" input will be applied to Ex. OR Det. 62, as illustrated by waveform A3 of FIG. 4. As a result, the output of Ex. OR Det. 62 will follow the $\overline{Q}$ input to terminal 64 and will turn transistor 76 on and off as per the 350 Hz waveform shown by waveform B3. Again, in accordance with the operation dictated by second filter stage 86, capacitor 90 will not be charged sufficiently during the off time of transistor 76 to turn on Ex. OR Det. 82, and its output C will remain at a low or "0" level indicating, again, that no wafer is present.

Finally, in the event that no wafer is present and there is a 120 Hz varying light falling on photodetector 26 (as from an incandescent or fluorescent light), transistor 56 will turn on and off at a 120 Hz rate, and there would be applied to terminal 60 of Ex. OR Det. 62 a 120 Hz signal, as shown by waveform A4. With waveform $\overline{Q}$ applied to input terminal 64 of this detector, its output waveform will be that shown as waveform B4 wherein during a two-cycle period (at a 350 Hz rate), the signal applied to transistor 76 will turn it on twice during this period, and thus, in accordance with the dictates of filter 82, capacitor 90 will not charge up to a value sufficiently high to trigger on Ex. OR Det. 82. Accordingly, its output, or the output of amplifier 80, will be low or a "0", properly indicating that no wafer is present.

The output C of amplifier 80 would typically be employed to turn on and off some apparatus (not shown) to accomplish some manufacturing step in the handling of wafer 10, or this output may be used to simply operate a signal light indicating the presence of wafer 10 at station 14 for the information of an operator remote to the scene.

The system of the present invention enables desired operation under most conceivable light conditions without the danger of any false triggering of the system and without the need to adjust sensors or electronics to accommodate different light conditions. The system is inexpensive and does not require any special component selection or adjustment. It may be made in a very small package and may be operated from a single power supply.

We claim:

1. A photoelectric detection system comprising:
   signal generating means for generating an electrical signal at a selected frequency;
   light means responsive to said electrical signal for generating a light output at said frequency;
   light sensing means for providing a delayed electrical output at said frequency when a discrete light path between said light means and said light sensing means is completed by a reflection of light from said light means onto said light sensing means;
   exclusively OR signal means responsive to an output of said signal generating means and an output of said light sensing means for providing a signal output which is significant only when the signal input at one, and only one, of the inputs is significant; and
   indication means responsive to said signal output of said exclusively OR signal means for providing a discrete indication signal when said signal output appears for less than a selected period within a selected period.

2. A system as set forth in claim 1 wherein said light sensing means is exposed to ambient light when said light path between said light means and said light sensing means is not completed by a said object.

3. A system as set forth in claim 2 wherein said indication means includes means for blocking a said indication signal when either the electrical output of said light sensing means is at a constant level or provides a 120 Hz signal.

4. A system as set forth in claim 3 further comprising means for positioning said light means and said light sensing means for directing their respective fields into overlapping regions, wherein said light means is not directly viewable by said light sensing means, and wherein an object entering said common field causes light striking said object to be then redirected to said light sensing means.

5. A system as set forth in claim 4 further comprising:
   support means including a way over which objects are routed; and
   an opening in said way, and said means for positioning includes means for directing said field through said opening, whereby, when a said object is moved over said opening, light from said light means strikes said object and is then directed to said light sensing means, thus providing a said indication signal.

6. A system as set forth in claim 5 wherein said indication means comprises:
   first filter means responsive to the output of said exclusively OR signal means for providing less than a selected level of signal as a filtered output when an output of said exclusively OR signal means appears for less than a selected portion of a selected period, and for providing a greater than selected level of filter output when the output of said exclusively OR signal means occurs for greater than said selected portion of a said period;
   switching means responsive to the output of said first filter means and to less than a said level for remaining in a normal, non-conductive, state and responsive to greater than a said selected level for assuming a conductive state; and
   output signal means including second filter means coupled to said switching means and responsive to less than a selected conductive period of said switching means for providing a said discrete indication signal.

7. A system as set forth in claim 6 wherein said object is a silicon wafer.

* * * * *